Jan. 9, 1968 YOSHIO KAGEYAMA ETAL 3,363,204

FREQUENCY DETERMINING CIRCUIT OF A FREQUENCY SHIFT OSCILLATOR

Filed Oct. 16, 1964

INVENTOR.
Yoshio Kageyama
Yasusuke Katsuda

BY

Meslem & Mestern

United States Patent Office 3,363,204

Patented Jan. 9, 1968

3,363,204

FREQUENCY DETERMINING CIRCUIT OF A FREQUENCY SHIFT OSCILLATOR

Yoshio Kageyama and Yasusuke Katsuda, Yokohama-shi, Japan, assignors to Kabushiki Kaisha Hitachi Seisakusho, Tokyo-to, Japan, a joint-stock company of Japan Filed Oct. 16, 1964, Ser. No. 404,460
Claims priority, application Japan, Oct. 17, 1963, 38/54,847
1 Claim. (Cl. 334—47)

ABSTRACT OF THE DISCLOSURE

A frequency determining circuit incorporated in a frequency shift oscillator to furnish good stability and elimination of jitter. The circuit consists essentially of two inductances, $L_1$ and $L_2$, connected in parallel; two capacitors, $C_1$ and $C_2$, series-connected; and a switch S which performs change-over actions in such a manner that it disconnects the short circuiting of $C_2$ when $L_2$ is to be connected and short circuits $C_2$ when $L_2$ is disconnected. The two change-over actions are carried out in accordance with a direct current pulse.

This invention relates to FS (frequency shift) modulation systems of carrier telegraphy and more particularly to a new frequency determining circuit in a frequency shift oscillator.

The nature and details of the invention will now be described with respect to a preferred embodiment of the invention and conventional circuits corresponding to this inventions in connection with the accompanying drawings, in which.

In an FS (frequency shift) modulation system of carrier telegraphy, the frequency of the carrier is changed over between $f_1$ and $f_2$ in response to the polarity or the on-off state of the D-C pulse according to the information to be transmitted.

Figure 1:
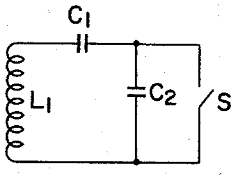
FIG. 1 PRIOR ART
FIG. 1 and FIG. 2 are circuit diagrams of two different examples of conventional frequency determining circuits.
Figure 2:
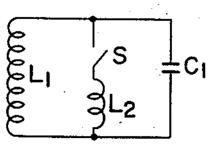
FIG. 2 PRIOR ART
Figures 5A, 5B, 5C, 5D:
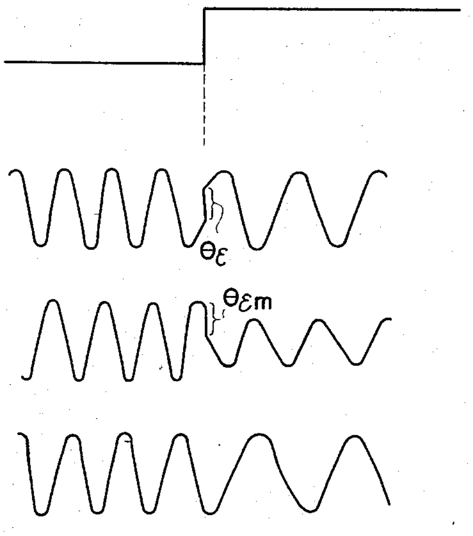
FIGS. 5*a, b, c, d* are waveform diagrams for a description of jitter of the FS oscillator.

The frequency determining circuit in the conventional FS oscillator which is widely used for this purpose is substantially a resonance circuit such as shown in FIGS. 1 and 2, in which some part of reactance is opened or closed by a switch S in accordance with the D-C input pulse such as for example shown in FIG 5*a*. This opening or closing of the reactance causes a discontinuity of phase angle or jitter at the instant when the frequency is converted from $f_1$ to $f_2$ or vice versa. When this wave having jitter arrives at a discriminator on the receiver side of the type to obtain D-C output proportional to the time differentiation of the phase angle, the jitter causes irregular distortion in the received D-C pulse. To solve this problem, a proposal has been made in The Bell System Technical Journal, November 1962, in which the current voltage ratio $$\frac{i(t)}{V(t)}$$

and the characteristic impedance $$\sqrt{\frac{L}{C}}$$

of the tank circuit is recommended to be kept unchanged during the transfer of the frequency from one to the other, and to realize this condition, the use of two active reactance oscillators connected in parallel is recommended for transferring of two frequencies. But owing to the active circuit elements, the frequency stability for the temperature variation is inferior to that of the conventional oscillators, and the circuit is too complicated for practical use.

This invention contemplates the provision of a simple and practical FS oscillator which, without departing too much from its ordinary composition, the conventional arrangement, has good frequency stability and can almost eliminate jitter by utilizing a suitable frequency determining circuit.

An example of the cause of jitter in the conventional circuits is indicated in FIG. 1, where, at the instant of closure of the switch S, the electrostatic charge stored in the capacitor $C_2$ is discharged, losing voltage, but the current value in this tank circuit cannot be varied instantaneously because of the inductance $L_1$, and the value of $$\frac{i(t)}{V(t)}$$

is changed before and after the switch operation. Since at the same time the characteristic impedance changes from $$\sqrt{\frac{L_1(C_1+C_2)}{C_1C_2}} \text{ to } \sqrt{\frac{L_1}{C_1}}$$

a high jitter occurs. Then when the switch S is opened again the current and voltage are kept constant, but since the characteristic impedance also changes, jitter is caused. In the case of FIG. 2, these states occur in an exactly opposite manner, and jitter occurs also at the opening and closing of the switch S.

Figure 3:
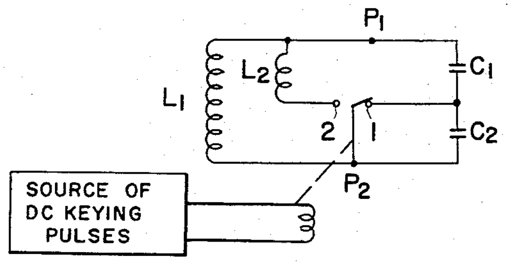
FIG. 3 is the equivalent circuit diagram of the embodiment of the frequency determining circuit according to this invention.
Figure 4:
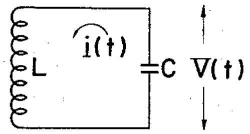
FIG. 4 is a circuit diagram for explanation of one example of a jitter-free circuit.

To improve this defect, the FS oscillator according to this invention is composed and arranged as indicated in FIG. 3. Here, the frequency determining circuit comprises two inductances $L_1$ and $L_2$ connected in parallel, two capacitors $C_1$ and $C_2$ connected in series, and a switch S which, when it is turned to position 1, short circuits the capacitor $C_2$ and at the same time opens inductance $L_2$, and when it is turned to position 2, connects the inductance $L_2$ and disconnects the short circuiting of the capacitor $C_2$, these changeover actions of the switch S being performed instantaneously. If it is supposed that the switch S is placed in the position 1 when the D-C pulses is in the space state, then when the D-C pulse changes from space to mark, the switch S will be turned to position 2. During the above operation, the inductance $L_2$ which at first has no current is connected in parallel to the tank circuit, and the capacitor $C_2$ which at first had no electrostatic charge is connected in series to the tank circuit. Accordingly, no disturbance of the current and the voltage at points $P_1$ and $P_2$ is caused, and hence the values of the current and the voltage are kept constant continuously before and after the operation of the switch S. Moreover, by selecting $L_2$ and $C_2$ to be suitable values respectively, the characteristic impedance $$\sqrt{\frac{L_1}{C_1}}$$

of the tank conduit just before the switch operation can be readily made equal to the characteristic impedance $$\sqrt{\frac{L_1L_2(C_1+C_2)}{(L_1+L_2)C_1C_2}}$$

just after the switch operation. Therefore, no jitter occurs in this circuit with respect to change from space to mark.

Next, the case when the D-C pulse is shifted from mark to space will be considered. The switch S is changed from position 2 to position 1. In this case the characteristic impedance is not changed, being kept at a constant value similarly as in the above case of change from space to mark. However, the electrostatic charge stored in the capacitor $C_2$ is discharged at the instant when the capacitor is short circuited, whereby the voltage $V(t)$ decreases. However, the current which has been flowing at the same time through the inductance $L_2$ is abruptly released, causing the current $i(t)$ to decrease. Consequently, the ratio $$\frac{i(t)}{V(t)}$$

at the points $P_1$ and $P_2$ is kept at a constant value before and after the change-over, theoretically causing no jitter due to phase angle discontinuity.

As hereinabove described, in the FS oscillator according to this invention, far less jitter occurs due to only the amplitude discontinuity in comparison with the conventional FS oscillator, the frequency being determined almost solely by the passive elements such as $L_1$, $L_2$, $C_1$ and $C_2$. Therefore the frequency stability with respect to temperature variation and characteristic deviations of the circuit elements is superior to that of the reactance type oscillator.

In the above description, the switch is described as a knife switch for the sake of simplicity, but it wll be obvious that the switch can be materialized by any other type such as a diode switch. Furthermore, the composition and arrangement of the circuit also can be modified within the scope of this invention, for instance, by using one tapped inductance instead of the two inductances, so long as this component can be indicated by the same electrically equivalent circuit as that shown in FIG. 3.

Accordingly, it should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

What we claim is:

1. A frequency determining circuit of a frequency shift oscillator, said circuit being equivalent at least electrically to a circuit comprising a first circuit having an inductance $L_1$ connected in parallel to two series-connected capacitors $C_1$ and $C_2$ and switching means to accomplish, in response to D-C signal pulses, the two change-over switching operations of opening a short-circuit connection of the capacitor $C_2$ when another inductance $L_2$ is connected in parallel to said first circuit and of disconnecting the inductance $L_2$ when the capacitor $C_2$ is short circuited.

No references cited.

HERMAN KARL SAALBACH, *Primary Examiner.*

M. L. NUSSBAUM, *Assistant Examiner.*